Aug. 14, 1928.
F. DE LAUTOUR
1,680,505
INTERNAL COMBUSTION ENGINE
Filed Jan. 28, 1926
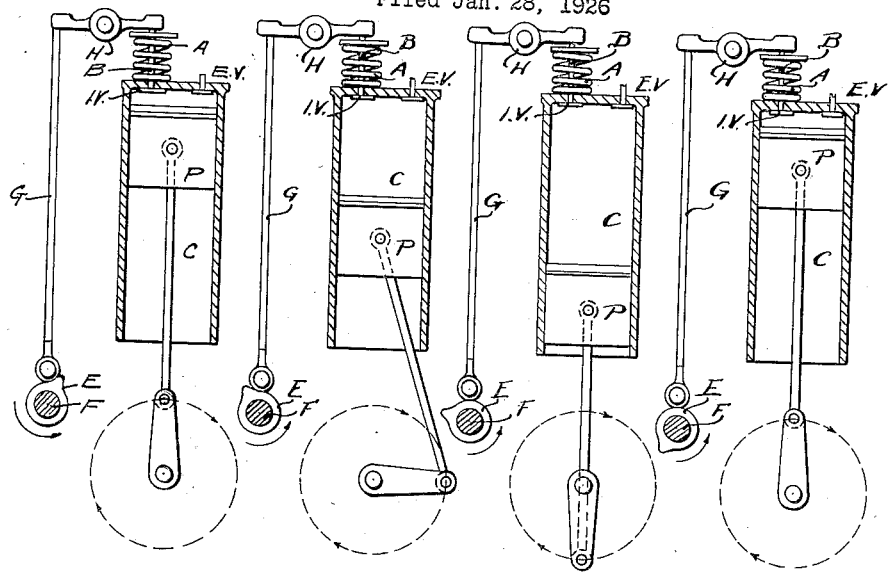
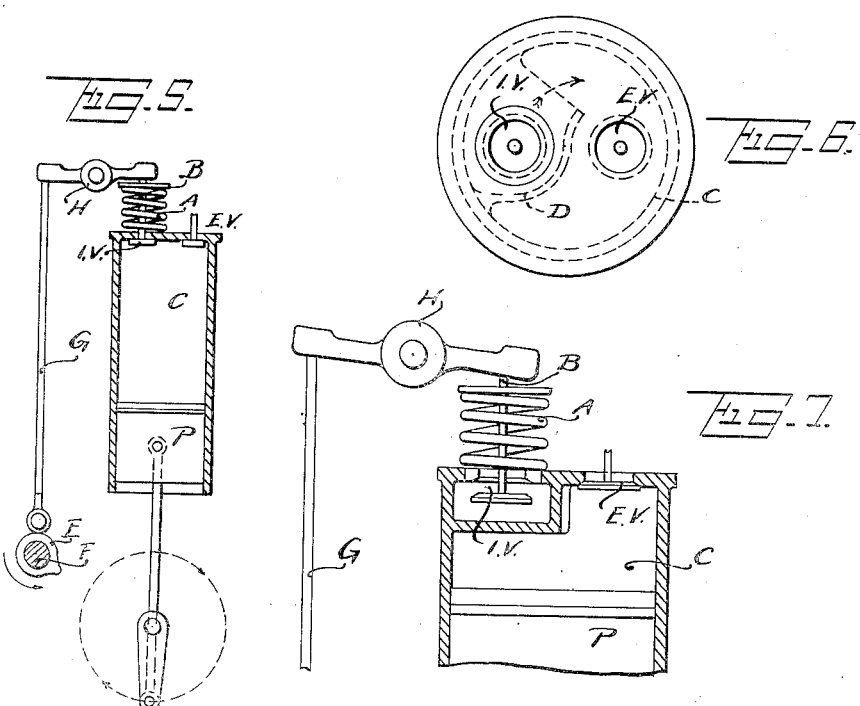
INVENTOR
Francis de Lautour
BY
ATTORNEY Patented Aug. 14, 1928.

1,680,505

UNITED STATES PATENT OFFICE.

FRANCIS DE LAUTOUR, OF WELLINGTON, NEW ZEALAND.

INTERNAL-COMBUSTION ENGINE.

Application filed January 28, 1926, Serial No. 84,356, and in New Zealand January 29, 1925.

This invention aims at the attainment of the following objects, namely increasing the efficiency of the engine, cooling the cylinder walls, and minimizing the noise of the exhaust so that even without a silencer the engine will not be unduly noisy. The efficiency of the engine is increased by enabling it according to my invention to do more work such as to run for a greater mileage on considerably less fuel consumption than theretofore. At present in the usual form of engine compression is carried out from or about atmospheric pressure and when combustion of the charge takes place the gases thereof are expanded and are still at a pressure considerably higher than atmospheric pressure when the piston reaches the end of its working stroke. In consequence a silencer is usually fitted to reduce the objectionable noise made by the issuing of the exhaust gases at a pressure above the atmospheric pressure. The silencer causes a loss of efficiency by its obstruction—causing a back pressure on the piston.

A further loss of efficiency is caused by the fact that the cylinder walls must be kept at a temperature sufficiently low to allow of lubrication of the piston. This is commonly accomplished by surrounding the walls with water, the passage of heat energy from the charge to the comparatively cool walls being direct loss of power.

The objects of my invention are attained especially as regards engines where air alone is not compressed broadly by drawing part of an ordinary charge into the engine cylinder by the outward stroke of the piston, closing the inlet valve by appropriate timing mechanism, continuing the outward stroke of the piston to its usual extent thereby expanding said charge, heating the expanded charge by heat from the cylinder walls thereby cooling said walls, and thereby heating said charge to approximately ordinary charge temperature then compressing and firing said charge as usual and forcing the consequent inert gases through the exhaust port at a pressure approximating atmospheric pressure.

According to my invention I reduce the losses as above mentioned and increase the heat efficiency of internal combustion engines by constructing the engine on what I call a "five phase cycle of operations". In addition to the usual operations I employ an additional phase which I call a refrigerating or negative heat operation following the induction or charge phase. This stroke may be accomplished by closing the inlet valve at any desired point before the piston has completed its outward travel; expansion of the charge and reduced temperature and pressure thereof then following. Thus in the case of an engine taking the charge from the atmosphere a partial vacuum exists in the cylinder at the outward or bottom dead centre of a single acting engine.

The charge takes in heat from the cylinder walls and piston during the refrigerating phase and compression may begin from approximately the usual temperature but from a pressure below the atmosphere.

Another feature of my invention is to have the inlet passages to the cylinder shaped to cause the incoming charge to move rapidly past the heated walls of the cylinder and piston to accelerate the passage of heat to the charge from these parts during the charging and refrigerating operations.

After compression the charge is raised in temperature by the combustion of fuel in the usual manner and the working stroke follows, but as the pressure approximates according to my invention that of the atmosphere at the end of this stroke the usual loss of power owing to their being pressure above the atmosphere in the usual type of engine at the point of release is eliminated.

The five operations or "phases" in my engine are therefore as follows:—

(1) Induction or charge phase.
(2) Refrigerating or negative heat pump phase.
(3) Compression or positive heat pump phase.
(4) Working or explosion phase.
(5) Exhaust or rejection phase.

As the compression in my engine may begin from a sub-atmospheric pressure it is permissible to use a much higher compression ratio than in the usual engine without causing detonation or "pinking" and the efficiency is raised by this means.

My invention is also applicable to engines of the type where air alone is compressed and the fuel supplied after compression; the larger available compression ratio making my cycle most suitable for operation. These engines may alternatively operate with much lower compression pressures and be made correspondingly lighter and less expensive to build.

Supercharging may be carried out with my cycle to any desired extent.

My invention has two striking characteristics, viz.

(1) The application of a sub-atmospheric or sub-inlet refrigerating or negative heat pump operation following the inlet or induction stroke.

(2) The shaping of the passages so that the incoming charge is caused to move rapidly in a swirling fashion past the hot wall and piston surfaces during inlet and refrigerating strokes. The invention is illustrated by the accompanying diagrams from which working drawings in many different ways may readily be constructed for different applications of my invention.

Referring to the diagrams: Figures 1, 2, 3, 4 and 5 represent the position of the parts at the commencement of the various operations or strokes and Figures 6 and 7 are plan and elevation of a cylinder showing a method of obtaining the desired rapid and swirling motion of the charge past the heated surfaces.

In Figure 1 the piston P is at the end of the exhaust phase; the exhaust valve E V has closed and the inlet valve I V is about to open. The piston P travels down the cylinder C to the position shown in Figure 2 on the induction or charge phase when the inlet valve I V closes. The piston continues down the cylinder C on the negative or heat pump phase to position 3 thus expanding the charge and completing the refrigerating phase.

The piston moves up the cylinder C from position 3 to position 4 on the compression phase when the fuel is fired and the piston P moves down the cylinder C to position 5 when the exhaust valve opens and the piston P moves up the cylinder to position (1) completing the exhaust phase and the cycle of operations.

Figures 6 and 7 show a deflector D fitted to cause the incoming charge to move rapidly round the cylinder in the direction of the arrow to induce rapid transfer of heat to it from the heated metal parts.

The inlet and exhaust valves are operated in properly timed relation with the movements of other parts of the engine in any well known and conventional manner. As illustrated, the inlet valve I V is normally held on its seat by a spring A coiled about the stem B of the valve. The inlet valve is opened at the proper time in the cycle of operation of the engine by a cam E mounted on a cam shaft F, which is driven from a moving part of the engine and is preferably geared to the crank shaft in the usual manner. The cam E acts on the lower end of the rod G, which is operatively connected by means of a pivoted lever H with the valve stem B.

According to the present invention, the cam E is so formed that the inlet valve will be closed when the piston reaches the position indicated in Fig. 2, that is to say, before the piston has reached the end of its intake phase. The exhaust valve may be controlled through a cam and rod connection somewhat similar to that utilized to actuate the inlet valve, but, inasmuch as such actuating mechanism is well known and does not constitute an essential feature of the present invention, it will not be described in detail.

While it is believed that the individual features of the present invention and the cycle of operation as a whole will be apparent from the foregoing description, the operation of the present engine may be briefly summarized as follows:

When the parts are in the position indicated in Fig. 1, the piston has just completed its exhaust phase, the exhausted gases having been expelled through the exhaust valve. At this stage, the cylinder walls are in a highly heated condition due to the previous explosion. As the piston starts its downward movement on the intake phase, the inlet valve is opened by the cam E, thereby permitting the fresh gases to be drawn into the cylinder.

Due to the presence of the baffle D adjacent to the inlet port, the incoming gases are directed in a swirling, circular path around the walls of the cylinder, and owing to the fact that the baffle D forms a somewhat restricted entrance for the incoming gases, the speed of the latter is accelerated.

When the moving piston reaches the position indicated in Fig. 2, the inlet valve is closed through the actuating mechanism described, the piston continuing its movement.

During this continued movement of the piston, that is to say, from the position indicated in Fig. 2 to that of Fig. 3, the charge of gases within the cylinder is expanded, with consequent tendency to produce a reduction of temperature. Instead of such reduction of temperature taking place, however, the gases absorb heat from the walls of the cylinder generated by the previous explosion. In other words, the negative heat pump phase has the effect of putting the gases into a condition whereby they can more readily absorb the heat from the cylinder walls. In this manner, the cylinder walls are cooled, and so effective is the cooling action that in many instances it is possible to omit all water cooling jackets.

In addition to the useful result of cooling the cylinder walls, the absorption of heat by the gases increases the entropy of the latter so as to place them in a most suitable condition to give high thermo-dynamic efficiency on the succeeding power stroke.

The swirling movement imparted to the gases by the baffle D through which the gases are moved in close contact with the cylinder walls make it possible for the expanding charge to absorb a sufficiently large amount of heat from the cylinder walls to effectively cool the cylinder during the very short time that the piston is passing through the expansion phase.

Figures 4 and 5 illustrate the position of parts at the end of the compression and power phases of the piston, these operations being practically identical with those of previously known engines.

Claims:

1. The method of operating an internal combustion engine which comprises introducing a swirling charge, expanding the charge by increasing the volume of the space into which it has been introduced, and then compressing said charge.

2. The method of operating an internal combustion engine which comprises introducing a swirling charge, expanding the charge by increasing the volume of the space into which it has been introduced and then compressing it beyond the limits of the previous expansion.

3. The method of operating an internal combustion engine, which comprises introducing a swirling charge, simultaneously expanding, by increasing the volume of the space into which it has been introduced, and heating the charge, and then compressing the charge beyond the limits of the previous expansion.

4. The method of operating an internal combustion engine, which comprises introducing a swirling charge, simultaneously expanding the charge by increasing the volume of the space into which it has been introduced, and heating it by the heat generated in the previous explosion, and then compressing the charge beyond the limits of its previous expansion.

5. The method of operating an internal combustion engine which comprises introducing a swirling charge, expanding the charge to below atmospheric pressure by increasing the volume of the space into which it has been introduced, compressing the charge, igniting and expanding it to produce power, and then exhausting it at approximately atmospheric pressure.

6. An internal combustion engine having in combination a cylinder, a piston operable in said cylinder, means for admitting gases to said cylinder in a direction tangential to the walls thereof, and means for cutting off said gases before the piston reaches the end of its intake stroke.

7. An internal combustion engine having in combination a cylinder, a piston operable in said cylinder, an inlet for admitting gases to said cylinder, means adjacent said inlet for imparting to the gases a rotary movement around the walls of the cylinder, and means for closing said inlet before the piston reaches the end of its intake stroke.

8. An internal combustion engine having in combination a cylinder, a piston operable in said cylinder, an inlet valve for admitting gases to said cylinder during the intake stroke of the piston, means for closing the inlet valve before the piston reaches the end of its intake stroke, and means for imparting a swirling movement to the incoming charges of fresh gases.

9. An internal combustion engine having in combination a cylinder, a piston operable in said cylinder, an inlet valve for admitting gases to said cylinder, a baffle adjacent said inlet valve for imparting to the gases a swirling movement around the walls of the cylinder, and means for closing said inlet valve before the piston reaches the end of its intake stroke.

10. An internal combustion engine having in combination a cylinder, a piston operable in said cylinder, an intake valve for admitting gases to said cylinder, a baffle located on the inside of said cylinder adjacent the inlet valve to accelerate the speed of the incoming gases and impart a swirling movement thereto around the walls of the cylinder, and means for closing said inlet valve before the piston reaches the end of its intake stroke.

In testimony whereof I affix my signature.

FRANCIS DE LAUTOUR.